United States Patent [19]

Shimizu et al.

[11] Patent Number: 5,013,807
[45] Date of Patent: May 7, 1991

[54] ROOM-TEMPERATURE CURABLE COMPOSITION

[75] Inventors: Chiyuki Shimizu; Tamio Yoshida, both of Gunma, Japan

[73] Assignee: Toshiba Silicone Co., Ltd., Tokyo, Japan

[21] Appl. No.: 353,413

[22] Filed: May 18, 1989

[30] Foreign Application Priority Data

May 19, 1988 [JP] Japan .................... 63-122827

[51] Int. Cl.$^5$ .................................. C08G 77/06
[52] U.S. Cl. .......................... 528/17; 525/403; 525/523; 528/18; 528/21
[58] Field of Search ............. 528/18, 17, 21; 525/403, 523

[56] References Cited

U.S. PATENT DOCUMENTS 4,243,767  1/1981  Kaufman et al. ............... 525/403
4,659,798  4/1987  Pohl et al. ......................... 528/17
4,786,667  11/1988  Shimizu et al. .................. 525/523

Primary Examiner—Melvyn I. Marquis
Attorney, Agent, or Firm—Sughrue, Mion, Zinn, Macpeak & Seas

[57] ABSTRACT

A room-temperature curable composition comprising (A) 100 parts by weight of a polymer having a hydrolyzable silyl group at the terminal of the molecular chain, the main chain being substantially a polyether, (B) from 0.01 to 20 parts by weight of an organic silicon compound represented by the general formula

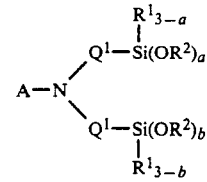

wherein two $R^1$s, which may be the same or different, each represents a monovalent hydrocarbon group; two $R^2$s, which may be the same or different, each represents an unsubstituted hydrocarbon group having from 1 to 6 carbon atoms; two $Q^1$s, which may be the same or different, each represents a divalent hydrocarbon group; a and b each represents 2 or 3; and A represents a hydrogen atom, a monovalent hydrocarbon group, or a monovalent group shown by the formula

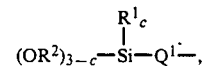

wherein $R^1$, $R^2$ and $Q^1$ have the same meaning as defined above and c represents 2 or 3; and
(C) from 0.01 to 10 parts by weight of a curing catalyst.

5 Claims, 1 Drawing Sheet

ROOM-TEMPERATURE CURABLE COMPOSITION

FIELD OF THE INVENTION

This invention relates to a composition suitable for a sealing composition, which is cured on contact with moisture into a rubber-like elastic body at room temperature, and more particularly to a room-temperature curable composition which is changed into a elastic body in a short period of time when it is brought into contact with moisture and shows an excellent water-resistant adhesive property for various materials to be adhered.

BACKGROUND OF THE INVENTION

Hitherto, as a room-temperature curable sealing material, a polyether the main chain of which is substantially composed of a polyether and having a hydrolyzable silyl group at the terminal of the molecular chain is known in JP-A-50-156599, etc., (the term "JP-A" as used herein means an "unexamined published Japanese patent application") and compositions using such a polyether as an effective component are known. That is, those compositions are disclosed, for example, in JP-A-52-73998 and have recently been used as a sealing material for joint portions of buildings.

Furthermore, for imparting an adhesive property, high elongating property, weather durability, and heat resistance to the above polymers, there are proposed copolymers of a polyether the terminal of the molecular chain of which is blocked by an epoxy group and various compounds such as an amino group-containing compound (JP-A-62-256828 and 283123), copolymers of the above polyether and amino group-containing polysiloxanes (JP-A-63-33425), copolymers of the above polyether and sulfur-containing heterocyclic compounds (JP-A-63-83131), and copolymers of the above polyether and amino group-containing heterocyclic compounds (JP-A-63-125524) by the same inventor of the present invention and also composition using those copolymers as the effective components are proposed.

It is necessary that those sealing materials strongly adhere to various materials constituting buildings and also that the adhered parts have excellent water durability for the purpose of preventing the entrance of rain water. However, in conventional sealing materials, there is a problem that they are insufficient in their water-resistant adhesive property according to the natures of materials.

Also, since the width in joint of buildings changes according to the change of temperature during a day, it is necessary that the sealing material is quickly cured after applying and quickly changes into an elastic body. A sealing material showing slow curing causes cracks or peeling by the change of the width of joint.

Thus, for increasing the curing rate of a sealing composition proposed by JP A-52-73998, etc., described above, a method of adding thereto an amine series compound such as laurylamine or tetramethylguanidine and a silane coupling agent having a primary amine such as γ-amino -propyltrimethoxysilane or γ-ethylenediaminopropyltrimethoxysilane is shown in JP-A-57-182350. However, the addition of those compounds causes a problem of reducing the water-resistant adhesive property thereof for many materials to be adhered, although they increase the curing rate.

SUMMARY OF THE INVENTION

This invention is to solve the above-described problems and the object of this invention is to provide a room-temperature curable composition which is excellent in water-resistant adhesive property for various materials to be adhered and changes on contact with moisture into an elastic body in a short period of time.

That is, according to this invention, there is provided a room-temperature curable composition comprising (A) 100 parts by weight of a polymer having a hydrolyzable silyl group at the terminal of the molecular chain, the main chain thereof being substantially a polyether, (B) from 0.01 to 20 parts by weight of an organic silicon compound represented by the general formula

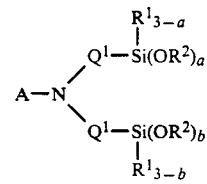

wherein $R^1$s, which may be the same or different, each represents a monovalent hydrocarbon group; $R^2$s, which may be the same or different, each represents an unsubstituted hydrocarbon group having from 1 to 6 carbon atoms; $Q^1$s, which may be the same or different, each represents a divalent hydrocarbon group; a and b each represents 2 or 3; and A represents a hydrogen atom, a monovalent hydrocarbon group, or a monovalent group represented by the formula

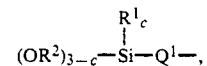

(wherein $R^1$, $R^2$ and $Q^1$ have the same meaning as defined above and c represents 2 or 3), and (C) from 0.01 to 10 parts by weight of a curing catalyst.

DETAILED DESCRIPTION OF THE INVENTION

Figure 1:
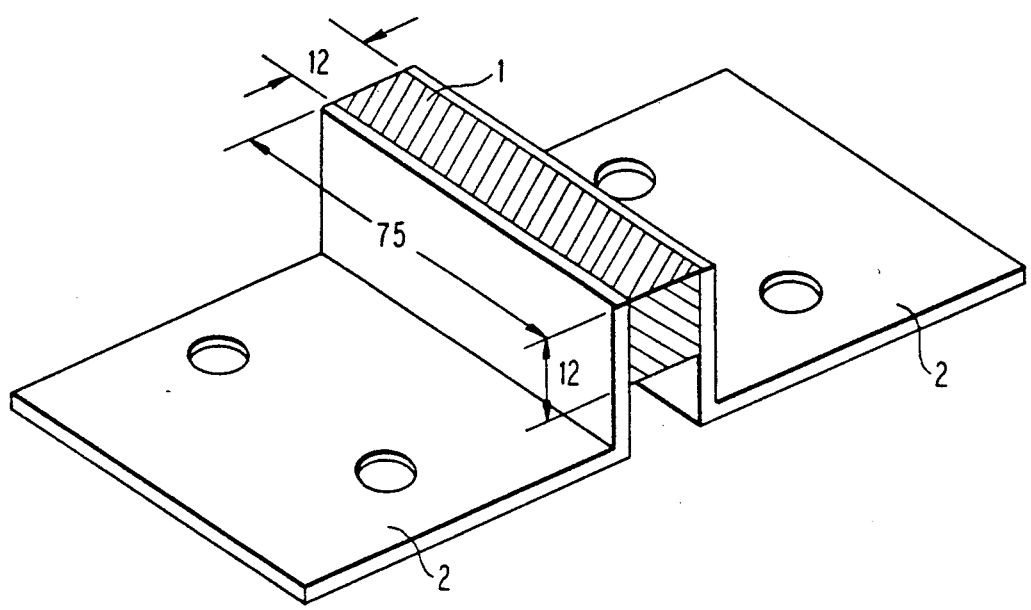
FIG. 1 is a perspective view showing an embodiment of subjecting a sample of this invention to a dynamic weathering test and FIG. 2 is a perspective view showing an embodiment of subjecting a test sample of this invention to a water-resistant adhesion test.

The present invention is described in detail below.

The component (A) for use in this invention includes a polyether the terminal of the molecular chain of which is blocked by a hydrolyzable silyl group shown by the formula

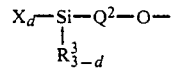

(wherein X represents a hydrolyzable group, d represents an integer of from 1 to 3, $R^3$ represents a monovalent hydrocarbon group, and $Q^2$ represents a divalent hydrocarbon group), which is usually used for this sort of room-temperature curable composition. The polyether described above in which $R_3$ is a monovalent hydrocarbon group having from 1 to 12 carbon atoms, such as an alkyl group, etc., or having from 6 to 12 carbon atoms, such as an aryl group, etc., and $Q^2$ is a divalent hydrocarbon group having from 1 to 14 carbon atoms is generally used.

The polyether has preferably a hydrolyzable silyl group at the whole terminals but in practice, from the easiness of availability of raw materials, the polyethers at least 70% of the whole terminals of which are blocked by a hydrolyzable silyl group can be used.

As the hydrolyzable group bonded to the silicon atom in the above-described polyether, there are an alkoxy group, an acyloxy group, an amino group, an aminoxy group, an oxime group, a ketoxime group, an amido group, an alkenyloxy group, a halogen atom, etc. In those groups, an alkoxy group is preferred from the points of not corroding the materials being adhered and generating less bad smell at the curing reaction, and a methoxy group is more preferable from the point of giving a proper curing rate.

The main chain of the polyalkylene ether as the component (A) consists essentially of a chemically bonded recurring unit shown by the formula $-Q^4-O-$ (wherein $Q^4$ represents a divalent alkylene group having from 2 to 4 carbon atoms) or a chemically bonded recurring unit shown by the formula $$(Q^4-O)_{\overline{n}}Y-$$

(wherein $Q^4$ has the same meaning as defined above and Y is the moniety shown below).

Practical examples of $Q^4-O-$ are $-CH_2CH_2O-$,

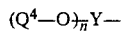
$-CHCH_2O-$, $-CHCH_2O-$, $-CH_2CH_2CH_2O-$, and $-CH_2CH_2CH_2CH_2O-$.

The polyesther for use in this invention may have not only one kind of the above-described recurring unit but also two or more kinds of the recurring units in a form of a mixture thereof but a polyester producing by using propylene oxide as the starting material is particularly preferred since, in this case, the polymer having a relatively high degree of polymerization is easily obtained and the polymer is in a liquid state at normal temperature in spite of the high degree of polymerization.

As the moiety shown by Y, there are, for example,

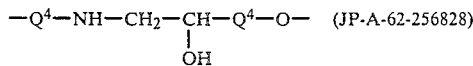

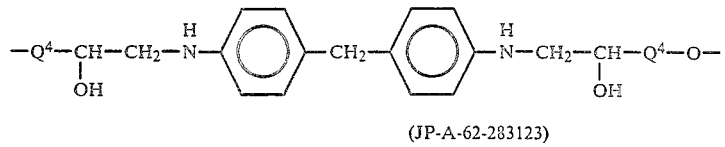

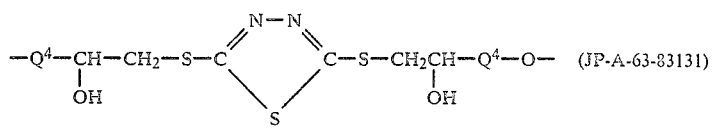

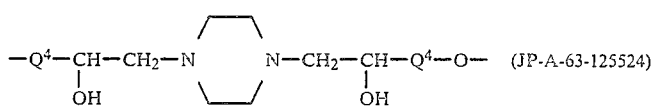

However, from the standpoint of more increasing the mechanical characteristics and the adhesive property of the composition, a heterocyclic compound having an amino group is preferred and further the moiety formed by using piperazine is more preferred.

Also the number of the above-described recurring unit(s) is selected such that the molecular weight of the component (A) is in the range of from 1,000 to 50,000, and preferably from 2,000 to 30,000. If the molecular weight thereof is less than 1,000, the elastic body obtained by curing the sealing composition does not have an elongating ratio required as a sealing material and if the molecular weight is over 50,000, the viscosity of the composition is very high to reduce the workability of the composition.

In a synthesis example of the component (A), the addition reaction of a polyether having an alkenyl group at the terminal of the molecular chain and a silicon compound having a hydrogen atom and a hydrolyzable group each bonded to a silcon atom is performed using a platinum catalyst.

The component (B) for use in this invention is a component for imparting an excellent water-resistant adhesive property to the composition for various materials being adhered. The component (B) is also a component for increasing the curing rate of the composition applied as a sealing material into an elastic body by assisting the function of the curing catalyst (C).

The component (B) is an organic silicon compound shown by the general formula

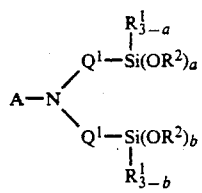

wherein $R^1$, $R^2$, $Q^1$, A, a, and b are same as defined above.

In the above formula, two $R^1$s, which may be the same or different, each is a monovalent hydrocarbon group such as an alkyl group (e.g., methyl, ethyl, propyl, butyl, and hexyl), an alkenyl group (e.g., vinyl and allyl), an aryl group (e.g., phenyl and tolyl), and an aralkyl group (e.g., benzyl and β-phenylethyl). In those groups, an alkyl group having from 1 to 8 carbon atoms and an alkenyl group are preferred from the standpoints of easiness of synthesis and availability of the component (B) or the precursor therefor. Furthermore, as $R^2$, an alkyl group having from 1 to 6 carbon atoms is preferred, and a methyl group or an ethyl group is particularly preferred.

Also, as the divalent hydrocarbon group shown by $Q^1$, a methylene group, an ethylene group, a trimethylene group or a tetramethylene group is preferred, and a trimethylene group is particularly preferred from the standpoints of the easiness for synthesis and availability of the component (B) itself or the precursor therefor.

In the above formulae, a, b, and c each is 2 or 3 but is preferably 3 for the purpose of obtaining the composition having an excellent water-resistant adhesive property and a high curing rate.

The proportion of the component (B) is from 0.01 to 20 parts by weight, and preferably from 0.1 to 10 parts by weight, per 100 parts by weight of the component (A). If the proportion of the component (B) is less than 0.01 part by weight, a sufficient water-resistant adhesive property and a sufficient effect of increasing the curing rate are not obtained, while if the proportion thereof is over 20 parts by weight, the elongating ratio of the elastic body obtained by curing the composition is undesirably reduced, whereby the composition is unsuitable for sealing materials.

In the above components (B), the component shown by the general formula

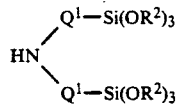

(wherein $Q^1$ and $R^2$ are same as defined above) is particularly preferred for the purpose of obtaining the composition which is excellent in the acceleration of the curing rate and the imparting of the water-resistant adhesive property and can give an elastic body having a sufficient elongating ratio.

As the curing catalyst for use in this invention, there are tin carboxylates such as tin octylate, dibutyltin dilaurate, dibutyltin maleate, dibutyltin phthalate, etc.; reaction products of organic tin oxides and the esters thereof; organic titanic acid esters such as tetrabutyl titanate, etc.; amines, amine salts, quaternary ammonium salts, etc. They can be used singly or as a mixture thereof. The curing catalyst (C) is preferably used in the range of from 0.01 to 10 parts by weight per 100 parts by weight of the component (A). If the proportion of the catalyst is less than 0.01 part by weight, a proper curing rate is not obtained, while if the proportion thereof is over 10 parts by weight, the curing rate becomes too fast and the properties of the composition are reduced.

The composition of this invention can further contain an inorganic filler for imparting proper non-flowability and reinforcement to the composition. Examples of the inorganic filler are aerosol silica, precipitated silica, ground silica, diatomaceous earth, calcium carbonate, titanium oxide, alumina, aluminum hydroxide, iron oxide, talc and clay. In addition, the inorganic filler may be surface-treated with an organic silicon compound such as trimethylsilane, hexamethyldisilazane, hexamethylcyclotrisiloxane, octamethylcyclotetrasiloxane, silicone oil, etc.

The composition of this invention can further contain a thixotropy imparting agent such as hydrogenated castor oil, etc., an antioxidant such as phenols, etc., and/or a ultraviolet absorber such as benzotriazole series compounds, etc., in addition to the above components. Furthermore, by adding a hydrolyzable silane such as alkoxysilane, etc., to the composition, the composition can be stored in a single package form.

Since the sealing material using the composition of this invention is cured on contact with moisture in a short period of time and changes quickly into an elastic body, the sealing material applied is scarcely influenced by the deviation of the width of points by the change of the environmental temperature during the curing step and hence neither creases nor cracks occur. Also, the sealing material has an excellent water-resistant adhesive property for various materials being adhered and thus the a sealing material once applied can function as sealing material for a long period of time without causing peeling even when the sealed portion is exposed to rain.

Then, the invention is further described in more detail by referring to the following examples and the comparison examples, wherein the parts are all by weight.

EXAMPLES 1 to 3 AND COMPARISON EXAMPLES 1 to 3

To 100 parts of polyoxypropylene having a mean molecular weight of about 8,000, having a group shown

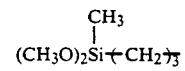

at the terminal group, and having a viscosity at 25° C. of 20,000 cSt were added fatty acid-treated colloidal calcium carbonate, heavy calcium carbonate, rutile-type titanium oxide, and hydrogenated castor oil in the amounts shown in Table 1 below and after mixing them uniformly by three rolls, the organic silicon compound and the curing catalyst shown in Table 1 were added to the mixture followed by mixing to provide Samples 11 to 16.

Each of the samples was cured in an atmosphere of 60% in relative humidity at 20° C. and the tack-free free time was measured in each case. The results obtained are shown in Table 1.

Also, the test structural sample shown in FIG. 1 was prepared using each sample composition. That is, two aluminum plates 2, 2 of 75 mm width were adhered to each other by the sealing composition 1 12 mm thick at the surfaces of the bent sides. The adhered area was 75 mm × 12 mm. Each test sample was mounted on a dynamic exposure test machine (made by Nikken K.K.) and after 7 days, the test sample was observed. The results obtained are also shown in Table 1.

Figure 2:
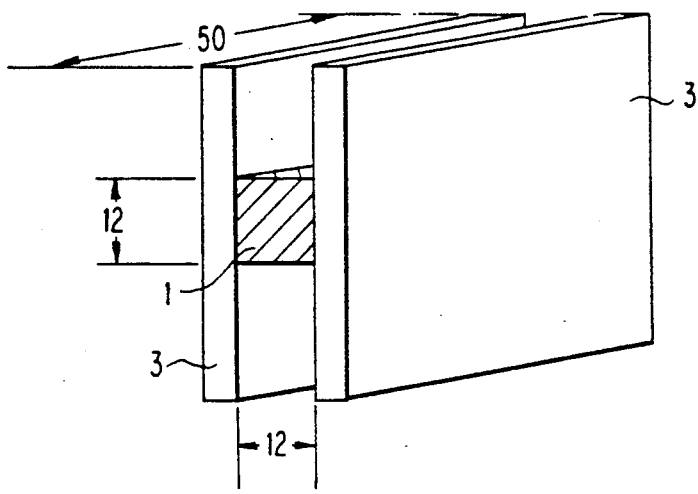

Furthermore, the test structural sample shown in FIG. 2 was prepared using each sample composition. That is, two plates 3, 3 of the material shown in Table 1 below having a length of 50 mm were adhered to each other by the sealing composition 1 of 12 mm thick at the surfaces thereof. The adhered area was 50 mm × 12 mm. Each test sample was cured for 28 days in an atmosphere of 60% in relative humidity and at 20° C. The test sample thus cured was immersed in water at 60° C. for 14 days and then subjected to a pulling apart test. The results obtained are also shown in Table 1.

In addition, in Comparison Examples 1 and 2, a conventional silane coupling agent having a primary amine was used in place of the organic silicon compound for use in this invention and in Comparison Example 3, the organic silicon compound was not used.

TABLE 1

| | | Example 1 | Example 2 | Example 3 | Comparison Example 1 | Comparison Example 2 | Comparison Example 3 |
|---|---|---|---|---|---|---|---|
| Sample No. | | 11 | 12 | 13 | 14 | 15 | 16 |
| Fatty Acid-Treated Colloidal Calcium Carbonate | (part) | 30 | 30 | 30 | 30 | 30 | 30 |
| Heavy Calcium Carbonate | (part) | 50 | 50 | 50 | 50 | 50 | 50 |
| Titanium Oxide | (part) | 10 | 10 | 10 | 10 | 10 | 10 |
| Hydrogenated Castor Oil | (part) | 2 | 2 | 2 | 2 | 2 | 2 |
| Organic Silicon Compound | (part) | 1.5 | — | — | — | — | — |
| HN〈(CH$_2$)$_3$Si(OCH$_3$)$_3$ / (CH$_2$)$_3$Si(OCH$_3$)$_3$ | | | | | | | |
| CH$_3$CH$_2$N〈(CH$_2$)$_3$Si(OCH$_3$)$_3$ / (CH$_2$)$_3$Si(OCH$_3$)$_3$ | (part) | — | 1.5 | — | — | — | — |
| (CH$_3$CH$_2$O)$_3$Si(CH$_2$)$_3$N〈(CH$_2$)$_3$Si(OCH$_2$CH$_3$)$_3$ / (CH$_2$)$_3$Si(OCH$_2$CH$_3$)$_3$ | (part) | — | — | 1.5 | — | — | — |
| Curing Catalyst | | | | | | | |
| H$_2$N(CH$_2$)$_3$Si(OCH$_2$CH$_3$)$_3$ | (part) | — | — | — | 1.5 | — | — |
| H$_2$N(CH$_2$)$_2$NH(CH$_2$)$_3$Si(OCH$_3$)$_3$ | (part) | — | — | — | — | 1.5 | — |
| Dibutyltin Laurate | (part) | 1 | 1 | 1 | 1 | 1 | 1 |
| Dibutyltin Oxide | (part) | — | — | — | — | — | — |
| Finger Touch Drying Time (minute) | | 30 | 60 | 60 | 30 | 30 | 1080 |
| Observation Resulting After Dynamic Testing | | Normal | Normal | Normal | Normal | Normal | Constricted & Cracked |
| Water-resistant Adhesive Property Test Results | | | | | | | |
| Stainless Steel | | | | | | | |
|   Maximum Stress (kgf/cm$^2$) | | 9.2 | 7.8 | 10.5 | Easily peeled | Easily peeled | Easily peeled |
|   Elongation at Breakage (%) | | 470 | 410 | 350 | | | |
|   Aggregation Breaking Ratio (%) | | 100 | 100 | 100 | | | |
| Secondary Electrolysis Colored Aluminum | | | | | | | |
|   Maximum Stress (kgf/cm$^2$) | | 8.6 | 8.1 | 9.6 | Easily peeled | Easily peeled | Easily peeled |
|   Elongation at Breakage (%) | | 430 | 480 | 390 | | | |
|   Aggregation Breakage Ratio (%) | | 100 | 100 | 100 | | | |
| Polycarbonate | | | | | | | |
|   Maximum Stress (kgf/cm$^2$) | | 9.4 | 8.5 | 9.4 | Easily peeled | Easily peeled | Easily peeled |
|   Elongation at Breakage (%) | | 480 | 430 | 340 | | | |
|   Aggregation Breaking Ratio (%) | | 100 | 100 | 100 | | | |
| Acryl Resin | | | | | | | |
|   Maximum Stress (kgf/cm$^2$) | | 8.8 | 8.2 | 10.0 | Easily peeled | Easily peeled | Easily peeled |
|   Elongation at Breakage (%) | | 420 | 490 | 350 | | | |
|   Aggregation Breading Ration (%) | | 100 | 100 | 100 | | | |
| Granite | | | | | | | |
|   Maximum Stress (kgf/cm$^2$) | | 9.5 | 8.6 | 11.3 | Easily peeled | Easily peeled | Easily peeled |
|   Elongation at Breakage (%) | | 490 | 440 | 370 | | | |
|   Aggregation Breaking Ratio (%) | | 100 | 100 | 100 | | | |

EXAMPLES 4 AND 5 AND COMPARISON

Each of the samples was tested as in Examples 1 to 3 and the results obtained are shown in Table 2.

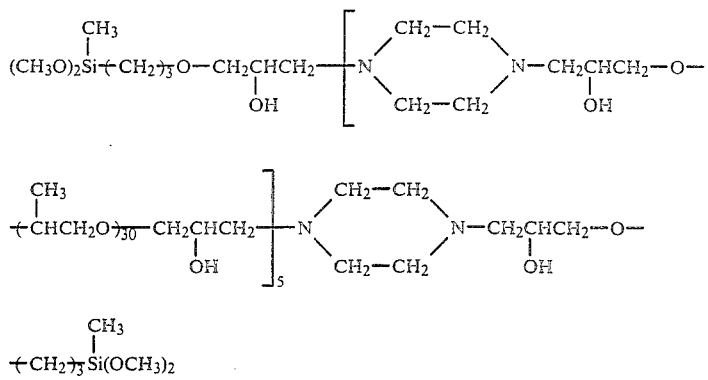

EXAMPLES 4 and 5

To 100 parts of the polymer shown by the following mean molecular formula having a mean molecular weight of about 10,000 and a viscosity at 25° C. of 31,000 cSt were added fatty acid-treated colloidal calcium carbonate, heavy calcium carbonate, lutile-type titanium oxide, and hydrogenated castor oil in the amounts shown in Table 2 below and after uniformly mixing the mixture by means of three rolls, the organic silicon compound and the curing catalyst shown in Table 2 were also added thereto followed by stirring to provide Samples 21 to 24.

In addition, in Comparison Example 4, a conventional silane coupling agent having a primary amine was used in place of the organic silicon compound for use in this invention and in Comparison Example 5, the organic silicon compound was not used.

TABLE 2

| | | | Example 4 | Example 5 | Comparison Example 4 | Comparison Example 5 |
|---|---|---|---|---|---|---|
| Sample No. | | | 21 | 22 | 23 | 24 |
| Fatty Acid-Treated Colloidal Calcium Carbonate | | (part) | 30 | 30 | 30 | 30 |
| Heavy Calcium Carbonate | | (part) | 50 | 50 | 50 | 50 |
| Titanium Oxide | | (part) | 10 | 10 | 10 | 10 |
| Hydrogenated Castor Oil | | (part) | 2 | 2 | 2 | 2 |
| Organic Silicon Compound | $HN(CH_2)_3Si(OCH_3)_3 / (CH_2)_3Si(OCH_3)_3$ | (part) | 1.5 | — | — | — |
| | $CH_3CH_2N((CH_2)_3Si(OCH_3)_3)_2$ | (part) | — | 1.5 | — | — |
| | $H_2N(CH_2)_3Si(OCH_2CH_3)_3$ | (part) | — | — | 1.5 | — |
| Curing Catalyst | Dibutyltin Oxide | (part) | 0.5 | 0.5 | 0.5 | 0.5 |
| Finger Touch Drying Time (minute) | | | 30 | 60 | 30 | 360 |
| Observation Results After Dynamic Water-resistant Adhesive Property Test Results | | | Normal | Normal | Normal | Constricted |
| Stainless Steel | Maximum Stress (kgf/cm$^2$) | | 8.6 | 8.1 | Easily peeled | 0.6 |
| | Elongation at Breakage (%) | | 420 | 450 | | 80 |
| | Aggregation Breaking Ratio (%) | | 100 | 100 | | 0 |
| Secondary Electrolysis Colored Aluminum | Maximum Stress (kgf/cm$^2$) | | 7.9 | 8.0 | Easily peeled | 0.8 |
| | Elongation at Breakage (%) | | 430 | 410 | | 120 |
| | Aggregation Breaking Ratio (%) | | 100 | 100 | | 0 |
| Polycarbonate | Maximum Stress (kgf/cm$^2$) | | 7.9 | 8.3 | Easily peeled | 0.8 |
| | Elongation at Breakage (%) | | 410 | 450 | | 90 |
| | Aggregation Breaking Ratio (%) | | 100 | 100 | | 0 |
| Acryl Resin | Maximum Stress (kgf/cm$^2$) | | 8.1 | 8.0 | Easily peeled | 1.1 |
| | Elongation at Breakage (%) | | 460 | 420 | | 140 |
| | Aggregation Breaking Ratio (%) | | 100 | 100 | | 0 |
| Granite | Maximum Stress (kgf/cm$^2$) | | 8.8 | 8.5 | Easily peeled | 1.5 |
| | Elongation at Breakage (%) | | 490 | 440 | | 170 |
| | Aggregation Breaking Ratio (%) | | 100 | 100 | | 0 |

EXAMPLES 6 AND 7 AND COMPARISON EXAMPLE 6

To 100 parts of the polymer as used in Examples 4 and 5 were added fatty acid-treated colloidal calcium carbonate, heavy calcium carbonate, rutile-type titanium oxide, and hydrogenated castor oil in the amounts shown in Table 3 and after uniformly mixing the mixture by means of three rolls, the organic silicon compound and the curing catalyst shown in Table 3 were added thereto followed by mixing to provide Samples 31 to 33.

Each of the samples was subjected to the water-resistant adhesive property test as in Examples 1 to 3 and the results are also shown in Table 3.

In addition, in Comparison Example 6, a conventional silane coupling agent having a primary amine was used in place of the organic silicon compound for use in this invention.

TABLE 3

|  |  | Example 6 | Example 7 | Comparison Example 8 |
|---|---|---|---|---|
| Sample No. |  | 31 | 32 | 33 |
| Fatty Acid-Treated Colloidal Calcium Carbonate | (part) | 30 | 30 | 30 |
| Heavy Calcium Carbonate | (part) | 70 | 70 | 70 |
| Hydrogenated Castor Oil | (part) | 3 | 3 | 3 |
| Organic Silicon Compound HN[(CH₂)₃Si(OCH₃)₂CH₃]₂ | (part) | 1.5 | — | — |
| (CH₃O)₂Si(CH₃)(CH₂)₃N[(CH₂)₃Si(OCH₃)₂CH₃]₂ | (part) | — | 1.5 | — |
| H₂N(CH₂)₃Si(OCH₃)₂CH₃ |  | — | — | 1.5 |
| Curing Catalyst  Dibutyltin Oxide | (part) | 1 | 1 | 1 |
| Water-resistant Adhesive Property Test Results |  |  |  |  |
| Stainless Steel  Maximum Stress (kgf/cm²) |  | 7.5 | 8.0 | 0.8 |
| Elongation at Breakage (%) |  | 630 | 440 | 130 |
| Aggregation Breaking Ratio (%) |  | 100 | 100 | 0 |
| Secondary Electrolysis Colored Aluminum  Maximum Stress (kgf/cm²) |  | 7.1 | 8.2 | 0.5 |
| Elongation at Breakage (%) |  | 590 | 470 | 80 |
| Aggregation Breaking Ratio (%) |  | 100 | 100 | 0 |
| Polycarbonate  Maximum Stress (kgf/cm²) |  | 7.2 | 7.8 | 0.4 |
| Elongation at Breakage (%) |  | 600 | 440 | 60 |
| Aggregation Breaking Ratio (%) |  | 100 | 100 | 0 |
| Acryl Resin  Maximum Stress (kgf/cm²) |  | 7.0 | 7.9 | 1.2 |
| Elongation at Breakage (%) |  | 580 | 450 | 110 |
| Aggregation Breaking Ratio (%) |  | 100 | 100 | 0 |
| Granite  Maximum Stress (kgf/cm²) |  | 7.2 | 8.0 | 1.3 |
| Elongation at Breakage (%) |  | 600 | 490 | 150 |
| Aggregation Breaking Ratio (%) |  | 100 | 100 | 0 |

While the invention has been described in detail and with reference to specific embodiments thereof, it will be apparent to one skilled in the art that various changes and modifications can be made therein without departing from the spirit and scope thereof.

What is claimed is:

1. A room-temperature curable composition comprising
   (A) 100 parts by weight of a polymer having a hydrolyzable silyl group at the terminal of the molecular chain, the main chain being substantially a polyether,
   (B) from 0.01 to 20 parts by weight of an organic silicon compound represented by the general formula

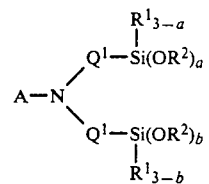

wherein two $R^1$s, which may be the same or different, each represents a monovalent hydrocarbon group; two $R^2$s, which may be the same or different, each represents an unsubstituted hydrocarbon group having from 1 to 6 carbon atoms; two $Q^1$s, which may be the same or different, each represents a divalent hydrocarbon group; a and b each represents 2 or 3; and A represents a hydrogen atom, a monovalent hydrocarbon group, or a monovalent group shown by the formula

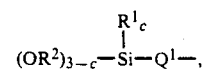

wherein $R^1$, $R^2$ and $Q^1$ have the same meaning as defined above and c represents 2 or 3; and (C) from 0.01 to 10 parts by weight of a curing catalyst.

2. The composition of claim 1, wherein the hydrolyzable group of the polymer (A) is an alkoxy group.

3. The composition of claim 1, wherein the polyether of the polymer (A) is essentially polyoxypropylene.

4. The composition of claim 1, wherein a, b, and c of the general formula showing the organic silicon compound (B) are 3.

5. The composition of claim 1, wherein A of the general formula showing the organic silicon compound (A) is a hydrogen atom.

* * * * *